United States Patent [19]
Crise

[11] 4,124,002
[45] Nov. 7, 1978

[54] PRESSURE-RESPONSIVE VARIABLE LENGTH CONNECTING ROD

[76] Inventor: George W. Crise, P.O. Drawer A, Danville, Ohio 43014

[21] Appl. No.: 746,462

[22] Filed: Dec. 1, 1976

Related U.S. Application Data

[63] Continuation-in-part of Ser. No. 707,933, Jul. 23, 1976.

[51] Int. Cl.² .......................................... F02B 75/04
[52] U.S. Cl. ............................. 123/78 E; 123/78 R
[58] Field of Search ............ 123/48 B, 78 R, 78 BA, 123/78 E

[56] References Cited

U.S. PATENT DOCUMENTS

| | | | |
|---|---|---|---|
| 988,344 | 4/1911 | Holzmueller | 123/78 E |
| 1,167,023 | 1/1916 | Schmidt | 123/78 |
| 1,506,540 | 8/1924 | Matson | 123/78 E |
| 1,560,492 | 11/1925 | Powell | 123/78 E |
| 1,747,091 | 2/1930 | Trbojevich | 123/78 E |
| 2,427,668 | 9/1947 | Gill | 123/48 B |

*Primary Examiner*—Charles J. Myhre
*Assistant Examiner*—David D. Reynolds
*Attorney, Agent, or Firm*—William S. Rambo

[57] ABSTRACT

A connecting rod whose length varies according to given pressure changes in the cylinder of an associated internal combustion engine. The connecting rod lengthens in response to subatmospheric pressures acting on the piston during the fuel intake stroke, and shortens in response to superatmospheric pressures of a given magnitude acting on the piston.

2 Claims, 13 Drawing Figures

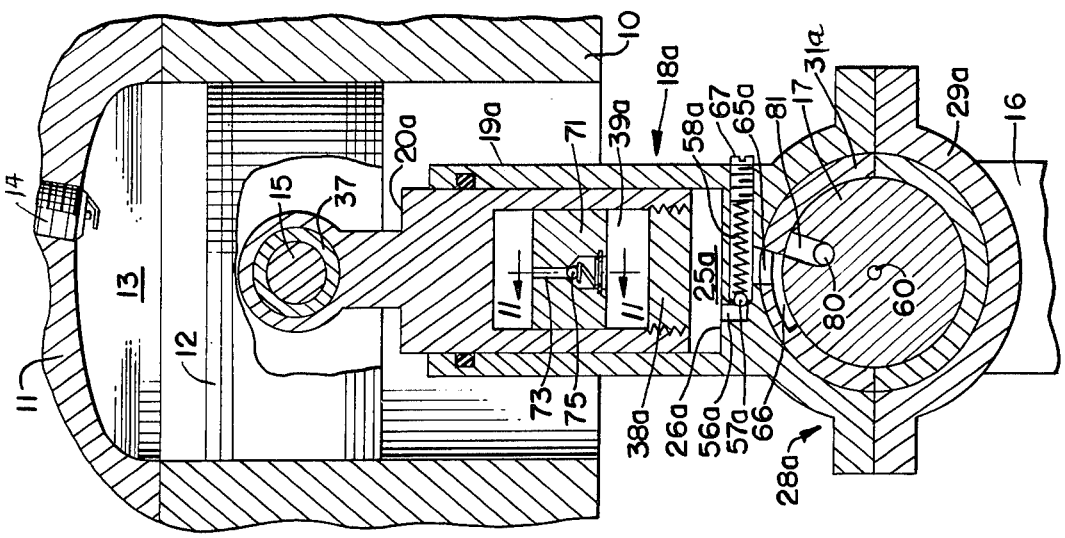
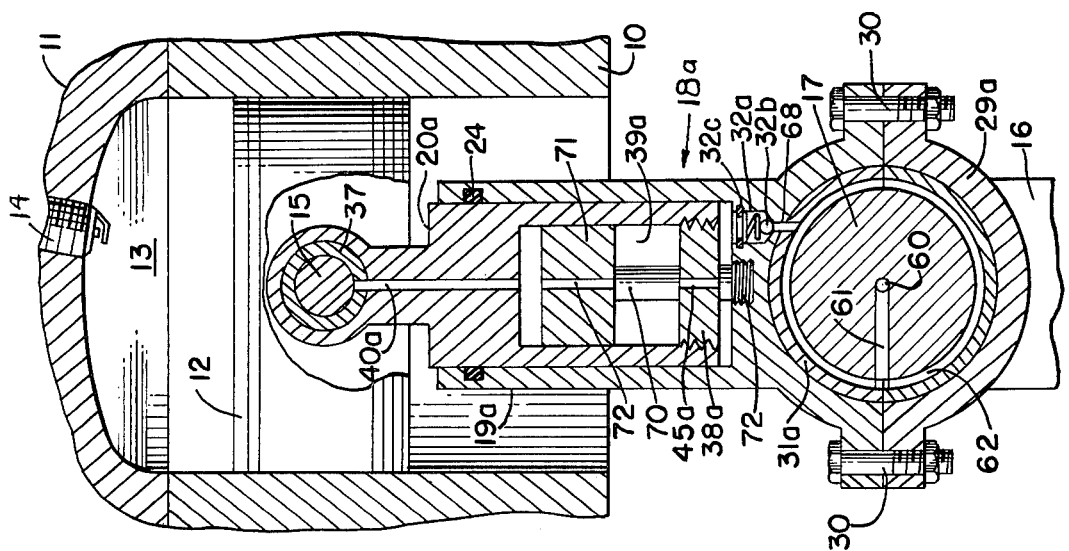
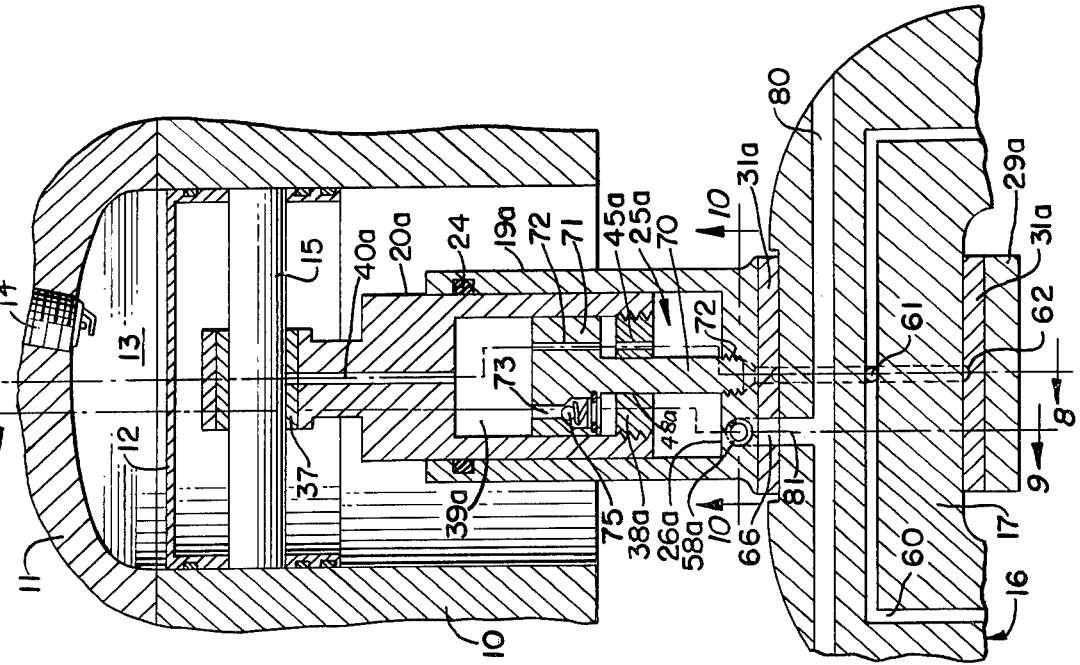

PRESSURE-RESPONSIVE VARIABLE LENGTH CONNECTING ROD

This application is a continuation-in-part of the prior application of George W. Crise Ser. No. 707,933 filed July 23, 1976 which is being abandoned concurrently with the filing of this application.

BACKGROUND OF THE INVENTION

This invention relates generally to connecting rods for internal combustion engines, and more particularly to a connecting rod whose length will vary to increase the degree of compression of the combustible fuel-air mixture in the cylinder of the engine under low or closed throttle operating conditions.

It is well-known that present day, four cycle internal combustion engines burn and utilize fuel more efficiently under full or open throttle conditions than under low or closed throttle conditions. This is because a partially closed throttle restricts the inflow of combustion air into the fuel intake manifold and/or the cylinder of the engine, so that the influent fuel-air charge is at a lower pressure and density than an influent fuel-air charge inducted into the engine cylinder under a more open throttle condition. Thus, when a relatively low density influent fuel mixture is compressed by the compression stroke of the engine piston, the pressure to which it is subjected at the time of firing is less than the pressure attained with a denser influent mixture.

Failure of the engine to compress the less dense (low throttle) fuel charges to the extent to which the denser (open throttle) fuel charges are compressed results in inefficient operation and consequent fuel wastage and air pollution hazards.

SUMMARY AND OBJECTS OF THE INVENTION

The connecting rod of this invention comprises two relatively movable, telescoping members connected, respectively, with a piston wrist pin and an associated throw of the crankshaft of an engine. The telescoping members define an oil chamber into which crankcase oil may be drawn upon each intake stroke of the piston to increase incrementally the effective length of the connecting rod, and from which oil may be ejected to decrease the effective length of the connecting rod in the event pressures acting on the piston reach a predetermined high level. A restricted orifice arrangement is provided to retard or slow the extension of the connecting rod, while one or more pressure relief valves are arranged to permit immediate shortening of the connecting rod in response to high pressures acting on the engine piston.

It is the primary object of this invention to provide means in the form of a variable length connecting rod for increasing the low throttle efficiency of an internal combustion engine.

Another object is to provide a connecting rod which will lengthen in response to low throttle-induced vacuum pressures acting on the piston during its intake stroke, to thereby cause the piston on its succeeding compression stroke to compress the less dense fuel-air mixture to substantially the same pressure as a denser fuel-air charge would have been compressed under open throttle conditions.

A further object of this invention is to provide a connecting rod which will rapidly shorten in response to the attainment of a given high pressure within the engine cylinder, such as might be caused by a sudden opening of the throttle, to thereby prevent pre-ignition and/or detonation which might otherwise result in damage to the engine.

These and further objects and advantages of the invention will become more apparent by reference to the following description and the accompanying drawings.

BRIEF DESCRIPTION OF THE DRAWINGS

FIG. 7 is a vertical sectional view illustrating a modified form of connecting rod according to this invention and showing the rod in approximately fully extended condition;

FIG. 8 is a vertical sectional view taken approximately along the line 8—8 of FIG. 7, but showing the connecting rod in approximately fully retracted condition;

FIG. 9 is a vertical sectional view taken approximately along the line 9—9 of FIG. 7 and showing the connecting rod in a partially extended condition;

DETAILED DESCRIPTION OF PREFERRED EMBODIMENTS OF THE INVENTION

Figure 1:
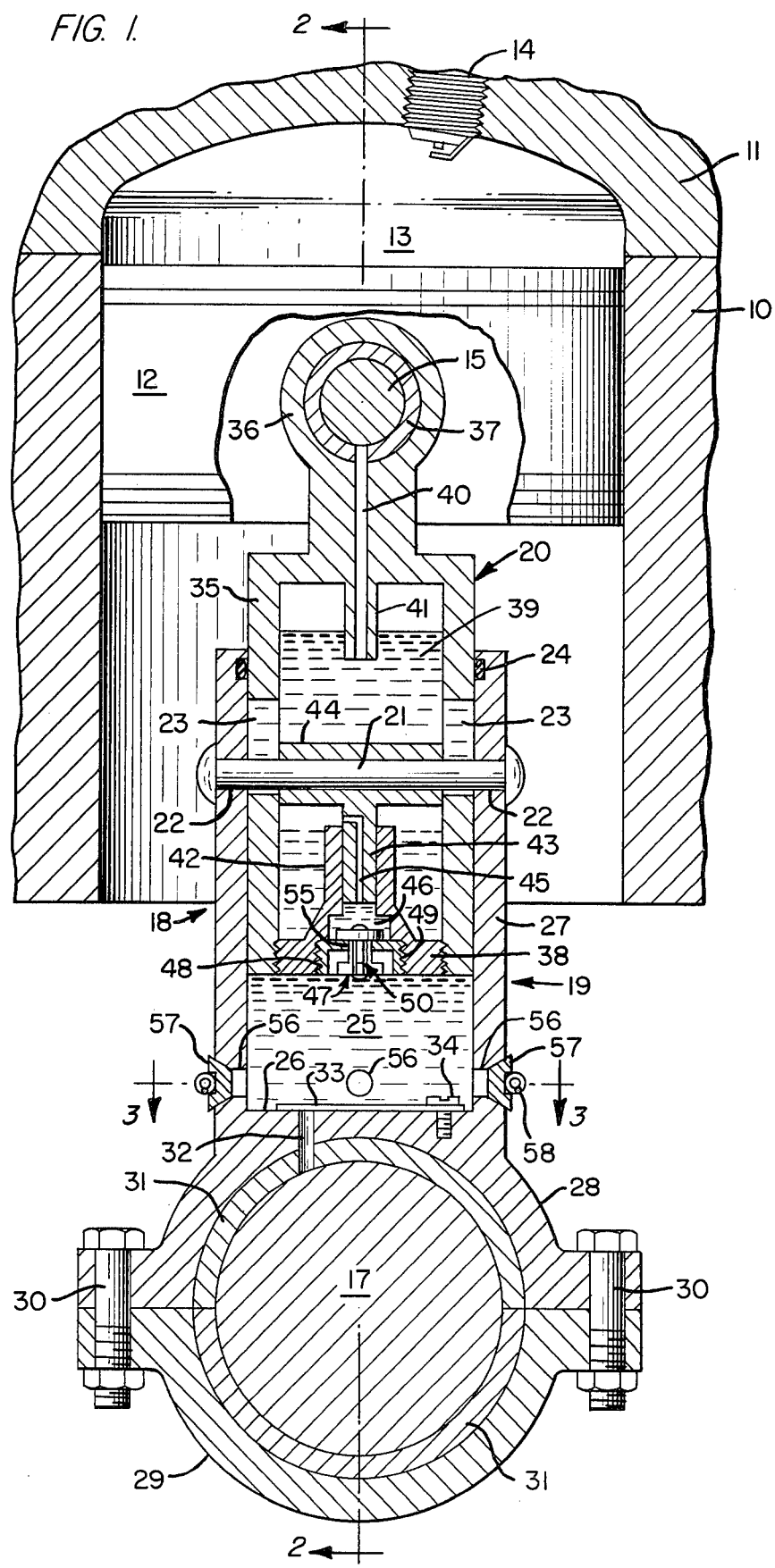
FIG. 1 is a fragmentary vertical sectional view taken through the plane of a cylinder of an internal combustion engine and showing one form of variable length conecting rod according to this invention.
Figure 2:
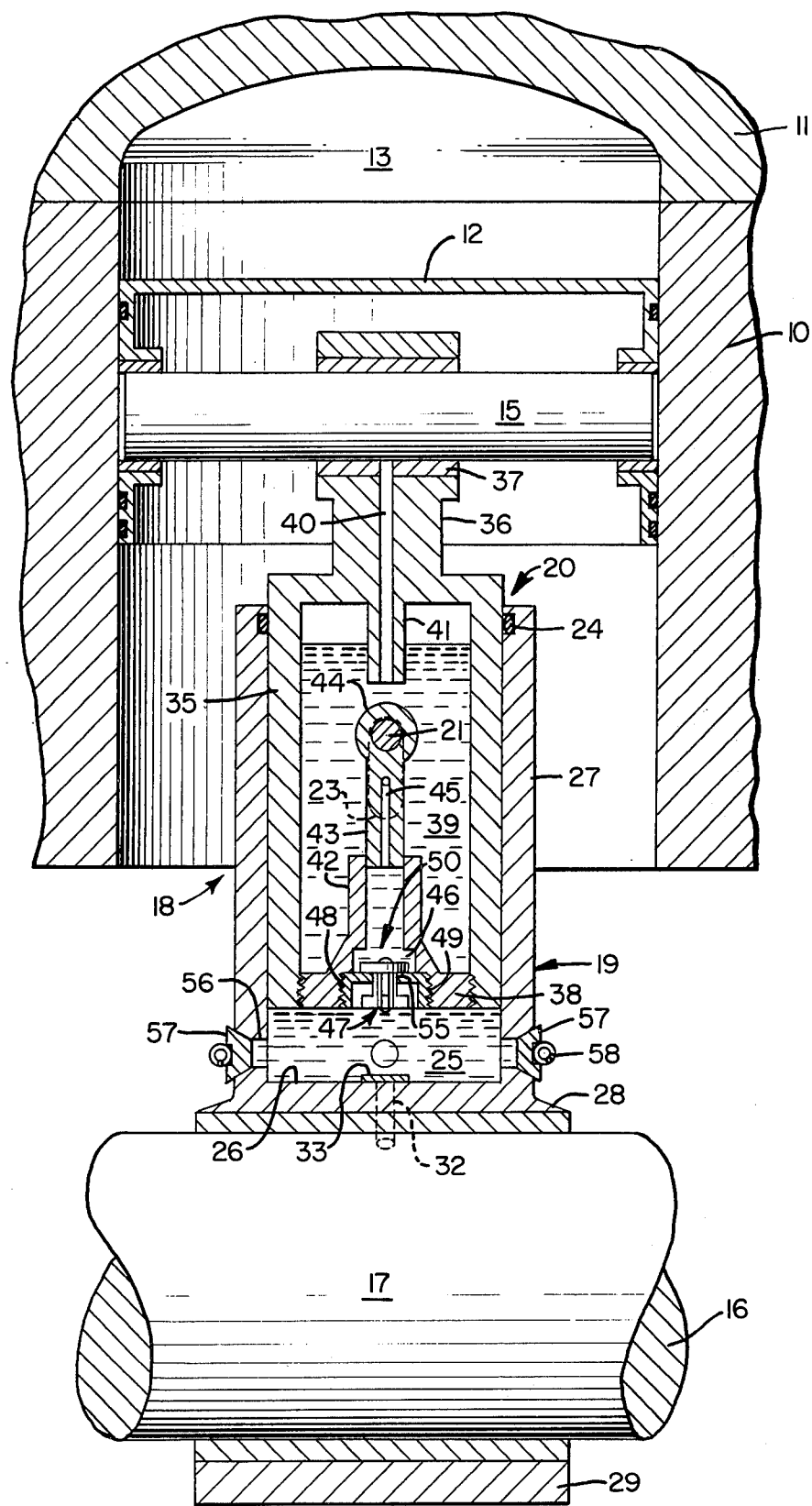
FIG. 2 is a similar view taken along the line 2—2 of FIG. 1, but showing the connecting rod in its retracted or shortened condition.

Referring now to FIGS. 1 and 2 of the drawings, a conventional four cycle internal combustion engine is displayed in part. As illustrated, the engine comprises a cylinder 10 having a removable cylinder head 11 and a piston 12 arranged for reciprocation in the cylinder and defining a combustion chamber 13 therein. A spark plug 14 is threaded into the head 11 of the cylinder to fire gases introduced into the combustion chamber 13. The piston 12 is provided in the usual manner with a wrist pin 15. The engine also includes a conventional crankshaft 16 having a throw 17.

According to this invention, a variable length connecting rod, indicated generally at 18, is connected between the wrist pin 15 and the throw 17 and replaced the conventional solid, fixed length connecting rod. The variable length connecting rod 18 generally comprises an outer tubular member 19 and an inner tubular member 20 slidably telescoping within the outer member. As shown more particularly in FIG. 1, a headed cross bolt or pin 21 extends diametrically through opposed openings 22 formed in the upper portion of the outer member 19 and through a pair of elongated diametrically opposed longitudinal slots 23 formed in the inner member 20. The cross pin 21 thus limits the extent of telescoping movement of the inner member within the outer member of the connecting rod. An O-ring 24 provides a fluid seal between the inner and outer telescoping members. The inner and outer members define between them a first fluid chamber 25 having a bottom wall 26.

The outer member 19 includes a hollow, cylindrical barrel portion 27 which terminates at its lower end in a saddle-shape, semi-cylindrical journal segment 28. A complemental, semi-cylindrical journal segment or clamp 29 is bolted, as at 30, to the segment 28, so as to rotatably embrace the crankshaft throw 17. As usual, the journal segments 28 and 29 are provided on their inner surfaces with arcuate bearing segments, or wear liners 31. The outer member 19 is also formed with a fluid inlet passage 32 through which lubricating oil under pressure in the crankcase of the engine (not shown) and in and around the throw 17 of the crankshaft, may be drawn into the chamber 25. A relatively thin, resiliently flexible reed or strip 33 is secured at one of its ends to the bottom wall 26 of the chamber 25 by a screw 34 and normally covers the inlet passage 32. The reed 33 provides with the inlet passage 32 a check valve to permit the free inflow of oil from the throw 17 of the crankshaft into the chamber 25, but prevents fluid flow in the opposite direction.

The inner member 20 comprises a hollow, but generally closed, barrel portion 35 and an upper eye journal 36 having a bearing sleeve 37 press-fitted therein and rotatably embracing the wrist pin 15. A closure plug 38 is threadedly carried in the lower end of the barrel portion 35 of the inner member and defines with the inner member a second fluid chamber 39. The eye portion 36 of the inner member 20 is formed with a lubricant passage 40 which extends from the wrist pin 15 through a tubular extension or pipe 41 and into the upper region of the second fluid chamber 39.

Figure 4:
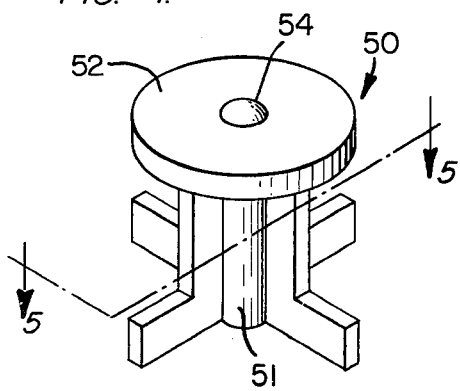
FIG. 4 is a detailed perspective view of the check valve member associated with the extension-retarding mechanism of the connecting rod shown in FIG. 1.
Figure 5:
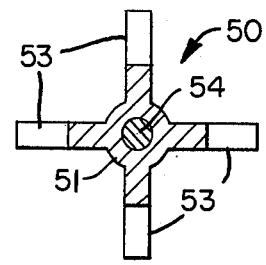
FIG. 5 is a detailed horizontal sectional view taken approximately along the line 5—5 of FIG. 4.

The connecting rod 18 further provides means for retarding or slowing relative extension or lengthening movement of the members 19 and 20. This retarding means takes the form of a dash pot cylinder 42 formed on the closure plug 38 and projecting into the second fluid chamber 39, and a plunger 43 which has a cylindrical T-head 44 journaled on the cross pin 21. The plunger 43 is formed with a relatively restricted, inverted L-shaped relief passage 45 which provides for the restricted flow of fluid between the chamber 39 and a counter bore 46 formed in the closure plug 38. A check valve 47 is mounted coaxially within the closure plug 38 and functions to permit fluid to flow freely from the first fluid pressure chamber 25 into the counter bore 46, but normally prevents the flow of fluid in the opposite direction from the counter bore 46 into the chamber 25. The check valve 47 includes a generally circular, inverted cup-shaped plug 48 threadedly carried in a screw-threaded socket 49 formed in the closure plug 38, and a movable valve element 50. The movable valve element 50 is shown in greater detail in FIGS. 4 and 5 and includes an intermediate finned or ribbed stem portion 51, a flat circular upper head portion 52, and a plurality of retaining flanges or feet 53 extending radially outwardly from the lower end of the stem portion 51. For ease of assembly, the flat head portion 52 of the valve element 50 is preferably formed as a separate part from the stem 51 and retaining feet 53 and is joined thereto by a rivet 54. The stem portion 51 of the valve element 50 is slidably carried in a central opening 55 formed in the plug 48 and the flat head portion 52 is of a diameter sufficiently large to overlie and close the opening 55 when seated thereon.

Figure 3:
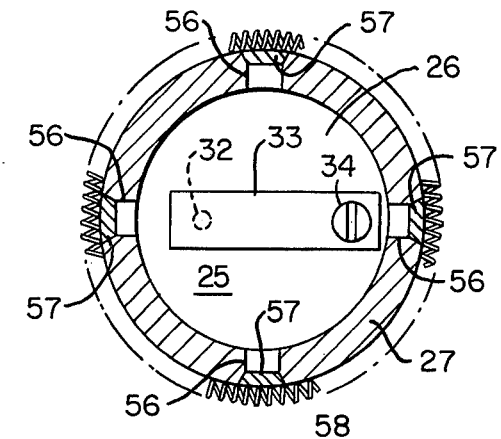
FIG. 3 is a horizontal sectional view taken along the line 3—3 of FIG. 1.

The barrel portion 27 of the outer member 19 is formed toward its lower end with four circumferentially spaced apart pressure relief ports 56. The ports 56 are fitted with pressure relief plugs or valve members 57 which are resiliently biased toward closed positions by a contractile, garter-type spring 58, as more particularly detailed in FIG. 3. While the garter spring 58 is preferred, it should be understood that it may be replaced with any one of a number of different but functionally equivalent springs.

Figure 6:
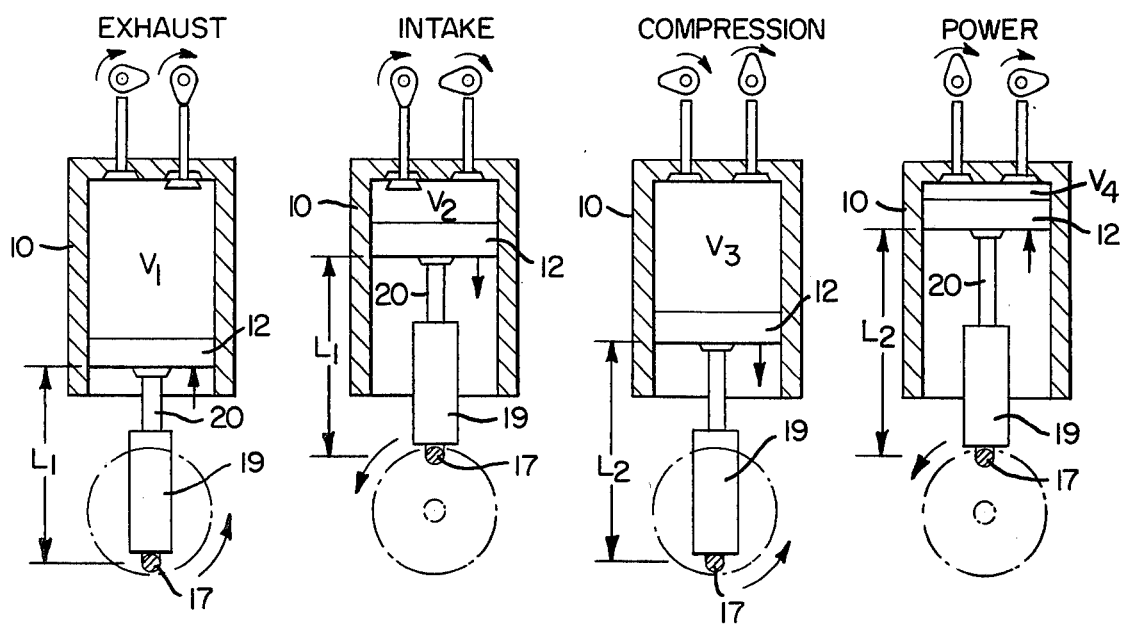
FIG. 6 is a series of diagrams showing the relative lengthening and shortening of the connecting rod of FIG. 1 during a typical four-cycle operation of the associated engine and the effects of the change in length of the connecting rod on the compression of the fuel-air mixture within the combustion chamber of the engine.

Assume that the inner and outer telescoping members 20 and 19 of the connecting rod 18 occupy relatively fully retracted positions, as shown in FIG. 2, and that the piston 12 of the engine is starting to move downardly from its top dead center position to begin its fuel intake stroke or cycle (see FIG. 6). If the throttle (not shown) is in a position to restrict or retard the flow of the fuel-air mixture into the cylinder 10, downward movement of the piston will cause a progressive reduction of pressure within the cylinder. Suction or subatmospheric pressures within the cylinder 10 impose an upwardly directed force on the piston 12 and on the inner member 20 of the connecting rod 18. At the same time the inertia of the crankshaft 16 applies a major downwardly directed force to the outer member 19 of the connecting rod. Thus, during the intake cycle of the engine and with the throttle in position to restrict the flow of fuel vapors to the cylinder 10, the connecting rod is subjected to tensile forces which tend to extend or increase the effective length thereof. However, as the inner and outer members 20 and 19 move relatively toward extension, the pressure within chamber 25 decreases with increase in volume, and oil from the crankcase of the engine, by way of the crankshaft throw 17, is drawn though the passage 32 into the chamber 25 to keep it full. At the same time, the dashpot plunger 43 and dashpot cylinder 42 move toward one another, but the outflow of oil from the dashpot cylinder is retarded by reason of the restricted size of the passage 45, and hence, full extension movement of the inner and outer members is retarded and slowed to the extent that the effective length of the rod will increase only slightly or incrementally from L1 to L2 (see FIG. 6) during any one intake stroke of the piston. As oil passes through the restricted passage 45 of the dashpot into the upper chamber 39, the pressure acting on the air trapped above the oil is increased so that oil is continually forced upwardly through the passage 40 to lubricate the wrist pin 15 and bearing ring 37.

Thus, when the piston 12 reaches a bottom dead center position at the end of its fuel intake stroke and at the beginning of its compression stroke, it will define a lesser volume V3 than the volume V1 which it defined at its bottom dead center position at the beginning of its preceding exhaust stroke or cycle. In other words, as the connecting rod lengthens on its downward fuel intake stroke in response to suction forces acting on the piston 12, the piston will not move as far down in the cylinder as it would had the connecting rod not extended. Now, as the piston begins its upward compression stroke or cycle, the connecting rod is placed under compression forces which pressurize the oil within the lower chamber 25 of the connecting rod, but the oil is trapped in the chamber 25 by the closed reed valve 33, the spring-pressed pressure relief valves 57 and the check valve 50 whose head 52 will seat in the counterbore 46 to close off the restricted passage 45. The effective length L2 of the connecting rod will remain the same throughout the compression stroke to thus cause the piston to rise to a higher level in the cylinder at its top dead center position and thereby decrease the volume V4 of the combustion chamber 13. This causes the less dense, low-throttle fuel mixture to be compressed to a higher pressure at the time of firing or explosion than it would have been in an engine using a fixed length connecting rod at the same throttle setting.

When the fuel charge is fired in the combustion chamber and the piston begins its downward power stroke, the connecting rod will be subjected to relatively high compressive forces and the fluid or oil within the chamber 25 will likewise be subjected to high pressures. Should the force exerted on the pressure relief plugs 57 by the high pressure oil within the chamber 25 exceed the opposing force of the spring 58, the plugs 57 will then be unseated to permit the outflow of oil from the chamber 25 through the opened ports 56. The inner member 20 will then move into the outer member 19 to shorten the effective length of the connecting rod. If, however, the pressure of the burning gases within the combustion chamber 13 and the consequent compressive force on the connecting rod is not sufficiently large to unseat the relief valve plugs 57, the increased length L2 of the connecting rod will remain during the power stroke and the following exhaust stroke, but will be subject to a further increase in length upon the next intake stroke.

Sooner or later, however, the pressure of combustion gases in the combustion chamber will rise to a level at which the compressive forces acting on the fluid in the chamber 25 exceed the designed force of the spring 58, at which time the relief valves 57 will permit oil to escape from the chamber 25 and the inner member 20 to telescope back into the outer member 19 of the connecting rod to shorten its length. Shortening of the connecting rod immediately relieves or decreases combustion pressures and this safeguards the engine parts against possible damage or destruction caused by excessive pressures acting on the piston.

FIGS. 7 through 12 of the drawings illustrate and relate to a modified, but preferred form of variable length connecting rod 18a which shortens in length in response to a predetermined build-up of pressure within the combustion chamber 13 of the engine upon the compression stroke, rather than upon the power stroke, of the piston. In FIGS. 7–9, the crankshaft 16 is constructed with the usual lubricating oil passage 60 which extends centrally through the entire crankshaft, including the throw journals 17, and which conducts oil under positive pressure from the crankcase (not shown) to the throw journals 17. The oil passage 60 includes the usual radial feeder branch or sprue 61 which opens at the periphery of the throw journal 17 in registering communication with an annular, relatively shallow oil groove 62 formed in the inner wall surface of the semi-cylindrical bearing segments or wear liners 31a carried in the journal portion 28a and clamp segment 29a of the connecting rod 18a.

In accordance with this invention an oil relief or exhaust passage 80 is drilled completely through the crankshaft throw 17 in axially offset, parallel relation to the oil inlet passage 60, and empties at each end thereof into the crankcase (not shown) of the engine. A radial feeder passage 81 extends inwardly from the outer surface of the throw 17 and intersects the passage 80 intermediate the ends thereof. The feeder passage 81 is disposed in laterally offset relation to sprue 61 and in the plane of a segmental, arcuate port 66 formed in the inner bearing surface of the bearing segment 31a.

The connecting rod 18a includes an outer tubular section 19a which is journalled on the crankshaft throw 17 by the bearing clamp 29a, and an inner plunger section 20a journalled by a bearing sleeve 37 to the wrist pin 15 of the piston 12. The inner section 20a is formed with an internal chamber or bore 39a which is closed at its lower end by an annular, screw threaded plug 38a. The inner and outer members 20a and 19a of the connecting rod 18a define between them a fluid pressure chamber 25a. As shown particularly in FIGS. 9 and 10, the bottom wall 26a of the chamber 25a is formed with a relief port 56a which communicates with the inner end of a valve chamber or bore 65. The valve chamber 65 communicates by way of a short passage 65a (see FIG. 9) with the segmental port 66 formed in the bearing segment 31a. The relief port 56a is normally closed by a ball-type valve member 57a which is biased toward a closed position by a compression spring 58a whose tension may be adjusted by a screw 67 threaded into the outer end portion of the valve chamber 65. The ball 57a, spring 58a and screw 67 thus provide an adjustable pressure relief valve between the pressure chamber 25a and the segmental port 66.

The bottom wall 26a of the chamber 25a is formed with an oil inlet passage 32a disposed in spaced relation to the relief port 56a. The chamber 32a terminates at its lower end in a relatively more restricted orifice or passage 68 which extends through the bearing segment 31a and communicates with the annular groove 62 formed in the bearing segment 31a. The passage 32a houses a ball check valve 32b which is retained in the chamber by a snap ring 32c. The ball check valve 32b is arranged to permit oil to flow inwardly from the restricted passage 68, through the passage 32a and into the pressure chamber 25a, but blocks the flow of oil in the opposite direction.

The plug 38a is formed with an axial bore 48a and a restricted oil passage 45a extending completely therethrough. Extending through the axial bore 48a of the plug 38a is the elongated, cylindrical stem portion 70 of a stationary stabilizer piston 71. The lower end of the stem portion 70 is threaded into a central socket 72 formed in the bottom wall 26a of the pressure chamber 25a. The relatively enlarged head portion of the piston 71 is disposed in close-fitting, wiping contact with the wall of the bore or chamber 39a of the plunger member 20a and divides the chamber 39a into upper and lower compartments. As detailed particularly in FIG. 11, the piston 71 is formed to one side of the stem 70 with a relatively restricted oil passage 72 extending completely therethrough, and on its opposite side with a relatively larger, unrestricted passage 73. The passage 73 communicates at the lower end thereof with a counterbore 74 which houses a ball check valve 75. The valve 75 is lightly biased to close the passage 73 by a lightweight compression spring 76 which is retained in the counterbore 74 by a snap ring 77. The ball valve 75 is thus arranged to normally close the passage 73, but is unseated or opened in response to a relatively small differential of pressures above and below the piston 71. The upper portion of the inner plunger member 20a is formed with an axial lubricant passage 40a extending upwardly from the internal chamber 39a to the wrist pin.

In operation, the modified variable length connecting rod 18a as illustrated in FIGS. 7-13, operates in a manner similar to the variable length connecting rod 18 of FIGS. 1-6, except that it functions to maintain a substantially constant compression level within the combustion chamber at the point of firing regardless of the density of the influent fuel charge. The connecting rod 18a will vary in length so as to compress the influent fuel charge to a desired optimum high pressure commensurate with maximum engine efficiency and performance.

For example, let it be assumed that the connecting rod 18a is fully retracted to its shortest length, as illustrated in FIG. 8. Assume also that the throttle of the engine is in a partially closed position. Thus, as the engine piston 12 starts to move downwardly on its fuel intake stroke, the connecting rod 18a will be subjected to tensile forces caused by downward movement of the throw 17 of the crankshaft 16 and the suction pressure applied to the upper surface of the piston 12. This tensile force urges the inner plunger member 20a of the connecting rod to move relatively outwardly from the outer member 19a, but due to the restriction to the flow of oil imposed by the relatively restricted passages 68, 45a, and 72, the inner plunger member 20a of the connecting rod will extend only slightly or incrementally during each fuel intake stroke of the piston 12. Conversely, the inner plunger 20a of the connecting rod 18a will retract within the outer member 19a when it is subjected to a relatively large compression force while the relief passage 81 of the crankshaft throw 17 is in communication with the arcuate port 66 of the connecting rod bearing 31a. At the time of ignition of the fuel-air charge in the combustion chamber and the subsequent power stroke of the piston, the relief passage 81 has rotated past the port 66 and it is closed by the throw 17, so that the connecting rod 18a is locked against further shortening, and substantially the full power derived from the burning of the fuel-air mixture may be transmitted through the connecting rod to the crankshaft throw upon the power stroke of the piston.

Figure 12:
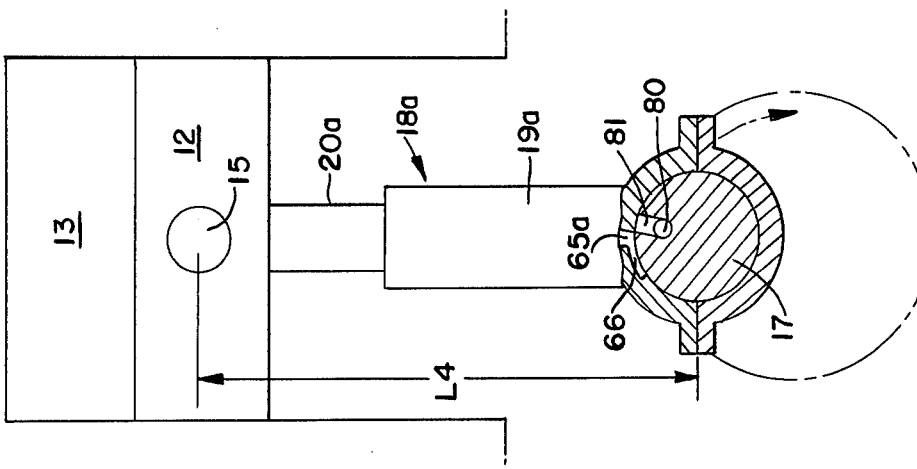
FIG. 12 is a diagrammatic sectional view illustrating the connecting rod in a relatively extended condition as the engine piston and crank throw move in a compression stroke.
Figure 13:
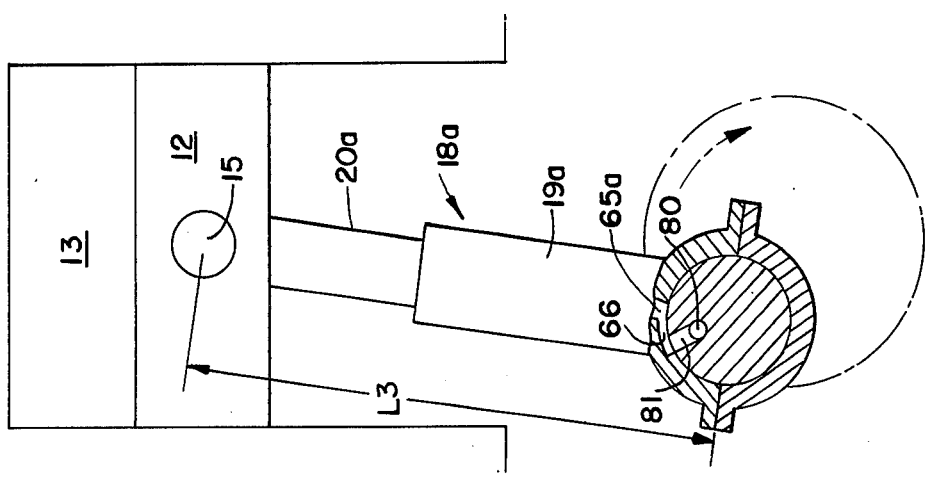
FIG. 13 is a similar view illustrating the connecting rod in a retracted or collapsed condition as the piston starts to move in a power stroke.
Figure 10:
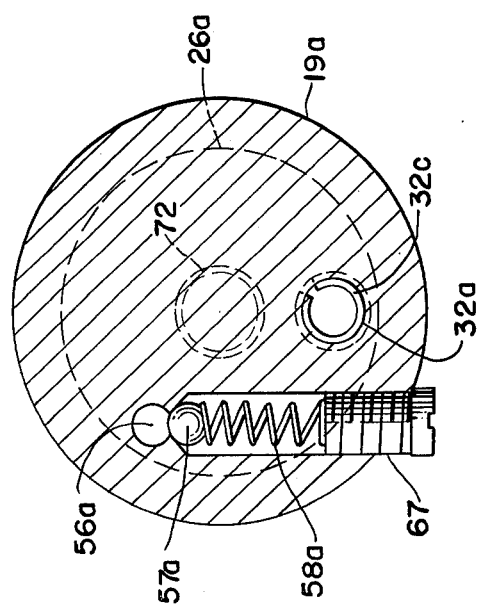
FIG. 10 is an enlarged horizontal sectional view taken approximately along the line 10—10 of FIG. 7.
Figure 11:
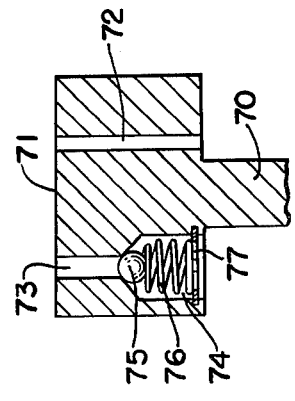
FIG. 11 is an enlarged, fragmentary vertical sectional view taken approximately along the line 11—11 of FIG. 9.

FIGS. 12 and 13 illustrate, diagramatically, the shortening of the variable length connecting rod 18a in response to the attainment of the desired high pressure within the combustion chamber 13 as the piston 12 moves upwardly in the last portion of its compression stroke prior to the firing of the fuel charge within the combustion chamber.

By reference to FIGS. 12 and 13, it will be seen that as the crankshaft throw 17 moves upwardly during each revolution of the crankshaft, the relief passage 81 is brought into communication with the arcuate port 66 at approximately 45°-50° before top dead center, and remains in communication therewith until approximately 5° before top dead center. Thus, if the pressure of the fuel-air charge in the combustion chamber 13 reaches the desired, optimum high pressure during the last portion of the compression stroke of the piston, but in advance of the firing of the fuel charge, the pressure within the pressure chamber 25a of the connecting rod 18a will unseat and open the pressure relief valve 57a and permit oil beneath the plunger 20a to be exhausted through the port 56a, the valve chamber 65, the passage 65a, the arcuate port 66, passage 81 and outwardly through passage 80 to the crankcase of the engine. The outflow of fluid from the chamber 25a permits the inner plunger 20a to retract in the outer member 19a to thus shorten the length of the connecting rod 18a from L3 to L4 while the piston 12 remains substantially stationary in the cylinder to hold the fuel-air charge at the desired, optimum pressure until it is ignited or fired. The passage 81 is preferably arranged so as to break communication with the port 66 just prior to the firing of the fuel-air mixture and thus prevent any shortening of the connecting rod and dissipation of power during the subsequent power stroke of the engine piston.

Thus, in effect, the variable length connecting rod 18a is operable to maintain substantially uniform compression of the fuel-air charge within the combustion chamber 13 of the engine regardless of throttle setting. In other words, under low or closed throttle conditions, the suction forces (low pressure) acting on the piston 12 during its fuel intake stroke will cause the connecting rod to increase in length so that the rarified fuel charge will be compressed to a greater extent, or to a higher pressure, on the succeeding compression stroke of the piston. Conversely, under relatively open throttle conditions, the initially denser fuel-air charge inducted into the engine cylinder on the intake stroke of the piston will cause the connecting rod 18a to shorten during the compression stroke of the piston. Thus, at the time of firing, the larger fuel-air charge will be compressed to substantially the same pressure as the smaller, closed throttle charge. The setting of the pressure relief valve screw 67 determines the pressure at which the connecting rod 18a will shorten.

The stabilizer piston 71 which occupies the chamber 39a of the plunger 20a functions to slow or retard the extension or lengthening movement of the plunger and thereby prevents a sudden, severe lengthening of the connecting rod in response to extreme suction forces applied to the engine piston during either the fuel intake or exhaust strokes of the piston. On the other hand, the comparatively large, unrestricted size of the pressure relief passages 73, 56a, 65a, 66, 81 and 80 permit the connecting rod 18a to rapidly shorten in response to compression forces above a given magnitude acting on the connecting rod at any time the relief passage 81 is in registry or communication with the port 66.

As will be readily apparent, the length of the present variable length connecting rods will change with different throttle positions, since the position of the throttle largely determines the pressures to which the piston is subjected during the intake and compression strokes of a four-cycle engine. For example, assume that the piston is moving on an intake stroke and the throttle is suddenly opened. The pressure of gases within the cylinder above the piston approaches atmospheric with the result that the piston will not be subjected to suction forces sufficient to further lengthen the connecting rod. However, the increased density of the fuel-air charge taken into the cylinder when the throttle is open causes the charge to be compressed to the desired optimum firing pressure in a shorter compression stroke than would be required to compress a less dense charge to the same pressure, and hence the connecting rod will shorten as will the compression stroke of the piston.

On the other hand, if the engine is caused to idle or operate for a prolonged period under relatively closed or low throttle conditions, the connecting rod will incrementally increase in length on each successive intake stroke of the piston until the optimum high pressure is reached, at which time the rod will retract and shorten the compression stroke of the piston.

If a constant, partially opened throttle setting is maintained for a sustained time period, such as would normally occur in turnpike operations of an automobile engine, the present connecting rod will almost reach an equilibrium condition of operation wherein the length of the rod will increase slightly on each intake stroke of its associated piston and decrease slightly on each successive stroke of the piston.

Due to its inherent ability to yield and shorten in length in response to a given high pressure in the combustion chamber, the present variable length connecting rods substantially eliminate the hazards normally attendant to pre-ignition, detonation and sudden opening of the engine throttle, and permits the engine to operate on a relatively lower octane-rated fuel that it would require were a fixed length connecting rod employed.

While preferred embodiments of this invention have been illustrated and described in detail, it will be apparent that various modifications as to details of construction and design may be made without departing from the spirit of the invention or the scope of the following claims.

I claim:

1. In an internal combustion engine which includes a combustion cylinder into which combustible gases may be introduced, compressed and burned, an engine piston reciprocable in said cylinder, a crankshaft having a throw formed with an oil supply passage therein, and a variable length connecting rod comprising first and second, relatively telescoping sections connected, respectively, with said engine piston and the throw of said crankshaft and defining within said connecting rod a hydraulic pressure chamber into which oil may be introduced to lengthen said connecting rod and from which oil may be exhausted to shorten said connecting rod; that improvement which comprises an inlet passage in the second section of said connecting rod for conducting oil from the crankshaft throw to said hydraulic pressure chamber; an exhaust passage means in the second section of said connecting rod for exhausting oil from said hydraulic pressure chamber; and means on the throw of said crankshaft for controlling the flow of oil through said exhaust passage means in accordance with the rotative position of said crankshaft throw.

2. An internal combustion engine according to claim 1, wherein said inlet passage is provided with a check valve opening toward said hydraulic pressure chamber, and wherein said exhaust passage includes a normally closed pressure relief valve openable in response to a predetermined high pressure within said hydraulic pressure chamber, and wherein said lastnamed means comprises a relief passage formed in said crankshaft throw.

* * * * *